United States Patent [19]
Mead

[11] 3,737,849
[45] June 5, 1973

[54] SEAT BELT ALARM SYSTEM

[76] Inventor: Philip E. Mead, 16795 Ivy Avenue, Fontana, Calif. 92335

[22] Filed: Aug. 30, 1971

[21] Appl. No.: 176,020

[52] U.S. Cl................340/52 E, 340/278, 307/10 SB
[51] Int. Cl..............................................B60r 21/00
[58] Field of Search...................340/52 R, 52 E, 278, 340/279; 307/10 SB

[56] References Cited

UNITED STATES PATENTS

| 3,440,602 | 4/1969 | Frig | 340/52 E UX |
| 3,437,993 | 4/1969 | Recio et al. | 340/52 E |
| 2,868,309 | 1/1959 | Burgess | 340/52 E |
| 3,340,523 | 9/1967 | Whitman | 340/52 E X |

*Primary Examiner*—Alvin H. Waring
*Attorney*—Lyon & Lyon

[57] ABSTRACT

A seat belt alarm system for vehicles which incorporates a pressure switch which secures the seat belt to the floor or frame of the vehicle and an audio and/or visual warning feature that is activated by the failure of the driver and/or passenger to open the switch by properly fastening their seat belts.

6 Claims, 5 Drawing Figures

Patented June 5, 1973

3,737,849

INVENTOR
PHILIP E. MEAD

BY Lyon & Lyon

ATTORNEYS

SEAT BELT ALARM SYSTEM

BACKGROUND OF THE INVENTION

The utility of seat belts or safety belts, the terms being used interchangeably herein, when properly installed in motor vehicles to prevent serious injury or death is well accepted. This is demonstrated by the number of states which require installation of seat belts in all automobiles and the requirement that auto manufacturers include safety belts in all their new models. However, there is a large segment of the public which due to forgetfulness or for some other reason fails to fasten their seat belts. While it may be undesirable, due to possible emergency situations which may arise, to install a mechanism which incapacitates the vehicles in the case of the failure to secure the seat belt, a signaling device which would warn the driver and/or passenger of his forgetfulness would be highly desirable. Such a mechanism, however, to receive wide acceptance must be economical to manufacture and capable of being easily installed in all new and used car models.

It is therefore the principal object of this invention to provide a seat belt alarm system which is capable of warning the driver and/or passenger of his failure to secure his seat belt and which is both economical to manufacture and easily installable in all makes and models of motor vehicles.

It is another object of this invention to provide a seat belt alarm system which cannot be easily permanently defeated by merely fastening one end of the belt to the other without extending the belt about the driver and/or passenger.

It is a still further object of the present invention to provide a seat belt alarm system which is compatible with most presently existing safety belt systems.

These and other objects and advantages of the present invention will become apparent from the following detailed description taken in conjunction with the accompanying drawings.

SUMMARY OF THE INVENTION

Briefly, the seat belt alarm system contains a pressure switch which is secured to the floor or frame of the vehicle and to which in turn is secured one end of a safety belt, and a warning feature which is activated by the failure of the driver and/or passenger to open the pressure switch by properly fastening his seat belt.

IN THE DRAWINGS

Figure 1:
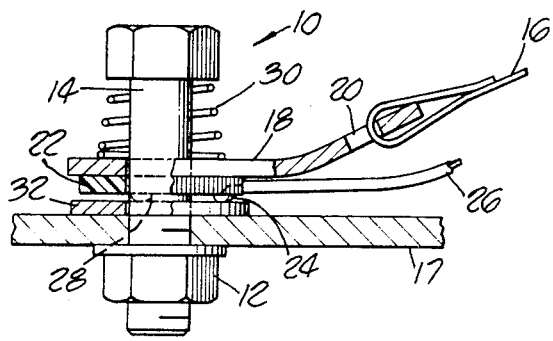
FIG. 1 is a sectional side view of the preferred embodiment of the pressure switch in the closed position.
Figure 2:
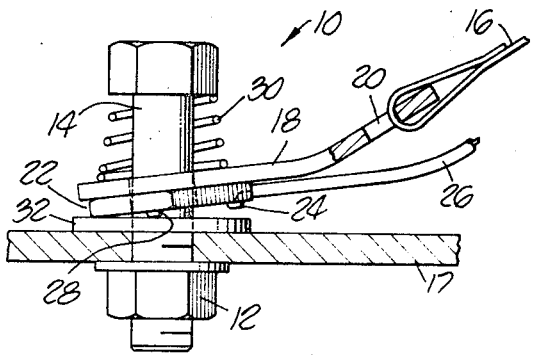
FIG. 2 is a sectional side view of the preferred embodiment of the pressure switch in the open position.

Referring now in detail to the drawings, the seat belt alarm system contains a plurality of seat belt pressure switches, designated 10, the preferred embodiment of which is shown in FIGS. 1 and 2. A pressure switch 10 is positioned at the point where one of the straps of a standard safety belt or seat belt arrangement is secured to the vehicle's floor or frame. As can be seen from the drawings, the pressure switch simply replaces the bolt which otherwise secures the belt to the floor or frame. In a passenger car, one switch would fasten one of the straps of the driver's seat belt to the floor or frame and a second switch would secure one of the straps of the passenger's safety belt system. A switch could also be secured to one of the straps of each of the seat belts in the back seat of the vehicle if so desired.

The preferred embodiment of pressure switch 10 contains a nut 12 and bolt 14 to secure a strap 16 of either the driver's or passenger's safety belt system to the vehicle's floor or frame 17. Nut 12 and bolt 14 are generally identical with the nut and bolt otherwise used to secure standard seat belt systems, thereby reducing the cost of converting such standard systems to include applicant alarm system. An angled anchor bracket 18, which is also generally employed in existing seat belt systems, is positioned about bolt 14 and has a channel 20 cut in the raised end thereof, through which strap 16 is placed, thereby securing the strap to the floor or frame as shown in the drawings. A contact support member 22 is secured to the underside of bracket 18 and extends about bolt 14. An electrical contact point 24 is carried by contact support member 22 and is in electrical contact with conductor wire 26. Contact support member 22 also has secured thereto a pair of pivot bearings or points 28, one of said points being mounted on each side of bolt 14. A conical spring 30 is positioned between bracket 18 and the head of bolt 14. It should be noted that the use of a conically shaped spring allows for a further reduction in the overall size of the switch, as the spring will lie flat upon sufficient compression. An electrically conductive washer or other surface 32 is positioned between contact point 24, pivot points 28 and the vehicle frame 17, thereby providing a surface upon which anchor bracket 18 can pivot upon being subjected to an angularly disposed force caused by pressure being exerted on straps 16. Washer 32 also acts as an electrical conductor between contact point 24 and the vehicle's floor or frame 17, which acts as a ground. Thus in operation, pressure switch 10 is biased in a closed position by spring 14 as shown in FIG. 1. In this position, wire 26 is grounded, as it is in electrical contact with floor or frame 17 through contact point 24 and washer 32. When an angularly disposed force is exerted upon anchor bracket 18 of the type which would result from pressure being exerted on strap 16, the biasing of spring 14 is overcome and anchor bracket 18 pivots about pivot points 28 and washer 32, thereby breaking the electrical contact between contact point 24 and electrically conductive washer 32. The electrical circuit is then open as wire 26 is no longer grounded.

Figure 5:
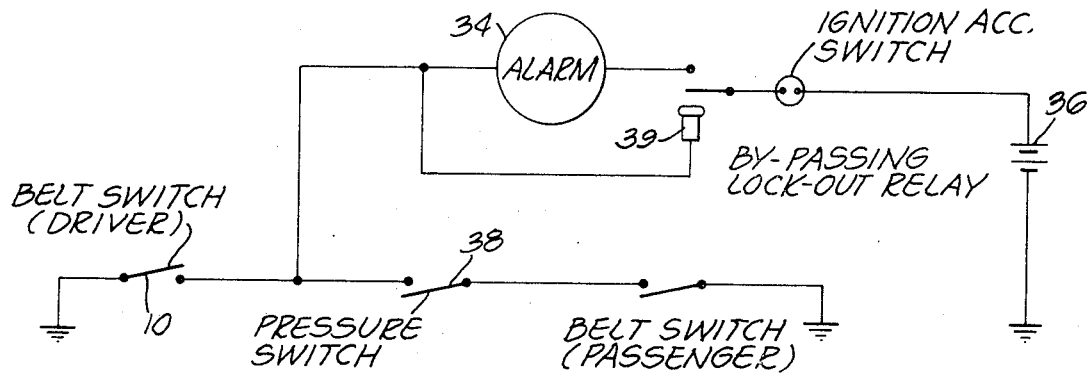
FIG. 5 is a diagrammatic view showing the electrical circuit of the seat belt alarm system.

In the seat belt alarm system, as noted above, a pressure switch 10 is provided for the driver's seat belt system and an additional such switch or switches may be similarly secured to an end of a strap on the passengers' safety belt systems. The circuitry incorporating these switches is generally shown in FIG. 5. When the ignition switch is turned on, an alarm 34, which is powered by the vehicle's battery 36, will be activated. Such an alarm can be of an audio and/or visual nature. The alarm 34 will be activated, however, only if the necessary switches are closed. A pressure detector switch 38 such as that shown in U.S. Pat. No. 3,449,714 or other similar switch, is provided to respond to the pressure of a passenger in the passenger's seat of the vehicle. Such a switch can be positioned in the back rest of the passenger's seat or in the seat itself. The back rest may be preferable to avoid accidental activation which may occur if it were placed in the actual seat itself and a heavy item was placed thereon. Once switch 38 is closed, if either the driver's or passenger's seat belt switch 10 is closed the alarm will be activated due to the closed circuit. If there is no passenger, switch 38 will remain open, cutting off the passenger's seat belt switch from the remainder of the circuit and the alarm will then be activated unless the driver's seat belt switch is closed, i.e., constant pressure is exerted upon strap 16 thereby breaking the contact between contact point 24 and washer 32. This pressure results, as noted above, from the driver's wearing of his seat belt.

The seat belt alarm system also includes a bypassing lock-out relay which is operable to temporarily cancel the alarm. It is provided for the convenience of the operator for situations in which, for one reason or another, the seat belts cannot be worn. The relay, however, must be reactivated each time the vehicle's ignition is turned on. This prevents permanent deactivation of the seat belt alarm system. It should be noted that there are several existing relays which satisfy the above requirement and the actual mechanism by itself does not constitute part of applicant's invention.

Figure 3:
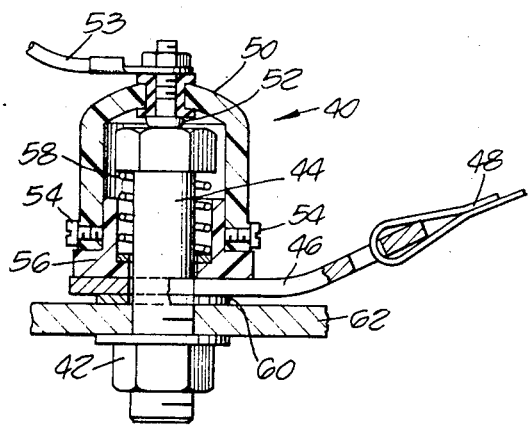
FIG. 3 is a sectional side view of a second embodiment of the pressure switch in the closed position.
Figure 4:
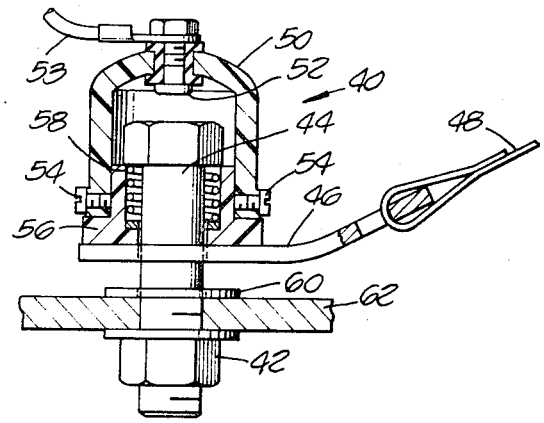
FIG. 4 is a sectional side view of the second embodiment of the pressure switch in the open position.

FIGS. 3 and 4 represent a second embodiment of the pressure switch. This second embodiment is designated 40. Pressure switch 40 is somewhat similar to switch 10. It employs a nut 42 and bolt 44 which are identical to nut 12 and bolt 14 in pressure switch 10. This second embodiment also employs a bent anchor bracket 46 to which is secured strap 48 just as pressure switch 10 had anchor bracket 18 to which strap 16 was secured. The remainder of the pressure switch 40, however, differs from that of pressure switch 10. Pressure switch 40 has an insulated housing 50 which covers the upper portion of bolt 44. An electrically conductive contact 52 is positioned in the top of housing 50 and to which is connected an electrically conductive wire 53 which corresponds to wire 26 in switch 10. Housing 50 is secured by fastening means 54 to a lower insulator 56. A helical spring 58 is positioned between the head of bolt 44 and insulator 56 thereby biasing the head of bolt 44 and beneath insulator 56. A spacer 60 may then be positioned below anchor bracket 46, between the anchor bracket and the vehicle's floor or frame 62. The structure is clearly shown in FIGS. 3 and 4. FIG. 3 shows switch 40 in a relaxed position, with spring means 58 urging the head of bolt 44 against contact 52 thereby completing an electrical connection from wire 53 to the grounded vehicle floor or frame 62. The application of the pulling force on strap 48 which would result from one's putting on a seat belt, causes anchor bracket 46 to raise insulator 56 and housing 50, thereby compressing spring 58 and breaking the contact between the head of bolt 44 and contact 52. In operation, when the seat belt is put on this contact is broken thereby opening the circuit and preventing the sounding of the alarm. The remainder of the system incorporating pressure switch 40 is identical to the system incorporating pressure switch 10.

Various changes and modifications may be made in carrying out the present invention without departing from the scope and spirit thereof. Insofar as these changes and modifications are in the purview of the appended claims they are to be considered as part of the invention.

I claim:

1. A seat belt alarm system for use in a motor vehicle having an ignition system which alarm system comprises an alarm, circuit means for activiating said alarm and switch means for opening and closing said circuit means, said switch means comprising a bolt member having an enlarged head portion for securing said seat belt to said vehicle, said bolt member being in electrical contact with said vehicle, an anchor member carried by said bolt member and secured to said seat belt and extending therebetween, a nonconductive housing having a base portion with an aperture therein, said housing being positioned about the upper portion of said bolt member, said bolt member extending through said aperture in said base portion, an electrical contact member positioned in the upper portion of said housing, and biasing means being positioned about the upper portion of said bolt member and extending between the enlarged head portion of said bolt member and said base portion of said housing, said biasing means urging said bolt member against said electrical contact member, thereby making electrical contact with said contact point, whereby upon exerting a force upon said anchor member of the type resulting from pulling on said seat belt, said anchor member will ride upwardly along said bolt member thereby raising said housing and said electrical contact member thereby breaking the electrical contact between said contact member and said vehicle.

2. A seat belt alarm system for use in a motor vehicle having an ignition system which alarm system comprises an alarm, circuit means for activating said alarm, and switch means for opening and closing said circuit means, said switch means comprising a bolt member having an enlarged head portion, the underside of said head portion defining a flat retaining surface, an anchor member adapted to be held by said bolt member, secured to the seat belt and extend therebetween, an electrical contact member carried on the underside of said anchor member and biasing means disposed between said retaining surface on the head portion of the bolt member and said anchor member, said biasing means urging said contact towards said vehicle thereby making an electrical contact between said contact member and said vehicle whereby said contact point is grounded.

3. A combination of claim 2 wherein said biasing means is a conical spring disposed about said bolt member between and in urging contact with said anchor member and said retaining surface of said bolt member.

4. A combination of claim 2 including an insulating member secured to the underside of said anchor member, said electrical contact member protruding downwardly from said insulating member, and a pair of pivot bearings disposed on the underside of said insulating members such that upon exerting a force upon said anchor member of the type resulting from pulling said seat belt, said anchor member will pivot on said pivot bearings thereby breaking said electrical contact between said contact member and said vehicle.

5. A seat belt alarm system for use in a motor vehicle having an ignition system which alarm system comprises an alarm, circuit means for activating said alarm, and switch means for opening and closing said circuit means, said switch means comprising a bolt member having an enlarged head portion, the underside of said head portion defining a flat retaining surface, an anchor member adapted to be held by said bolt member, secured to said seat belt and extend therebetween, an insulating member secured to the underside of said anchor member, an electrical contact member carried by and protruding downwardly from said insulating member, a coil spring disposed about said bolt member, between and in urging contact with said anchor member and said flat retaining surface of said bolt member, said spring urging said contact towards said vehicle thereby making an electrical contact between said contact member and said vehicle whereby said contact is grounded, and a pair of pivot bearings disposed on the underside of said insulating member such that upon exerting a force upon said anchor member of the type resulting from pulling on said seat belt, said anchor member will pivot on said pivot bearings thereby breaking said electrical contact between said contact member and said vehicle.

6. The combination of claim 5 wherein said anchor member has an aperture therein, said aperture being adapted for the passage of said bolt member therethrough, thereby holding said anchor member to said bolt member.

* * * * *